United States Patent

Frodin et al.

[11] Patent Number: 5,443,418
[45] Date of Patent: Aug. 22, 1995

[54] SUPERABRASIVE TOOL

[75] Inventors: James E. Frodin, Bertrange, Luxembourg; Scott Pellow, Niagara Falls, Canada; Jean Kramp, Rumelange, Luxembourg

[73] Assignee: Norton Company, Worcester, Mass.

[21] Appl. No.: 38,301

[22] Filed: Mar. 29, 1993

[51] Int. Cl.⁶ .............................. B24D 5/02; B24D 5/04
[52] U.S. Cl. ................................... 451/540; 451/541; 51/309
[58] Field of Search .................. 51/204, 206 R, 206.4, 51/206.5, 309; 451/540–543, 546, 552

[56] References Cited

U.S. PATENT DOCUMENTS

| | | | |
|---|---|---|---|
| 3,427,759 | 2/1969 | Kistler | 51/206 R |
| 3,972,161 | 8/1976 | Zoiss | 51/206 R |
| 4,048,762 | 9/1977 | Bair, Jr. | 51/206.5 |
| 4,314,827 | 2/1982 | Leitheiser et al. | 51/298 |
| 4,623,364 | 11/1986 | Cottringer et al. | 51/309 |
| 4,744,802 | 5/1988 | Schwabel | 51/309 |
| 4,770,671 | 9/1988 | Monroe et al. | 51/293 |
| 4,881,951 | 11/1989 | Wood et al. | 51/309 |
| 4,944,773 | 7/1990 | Rue et al. | 51/307 |
| 4,954,462 | 9/1990 | Wood et al. | 501/95 |
| 4,964,883 | 10/1990 | Morris et al. | 51/293 |
| 5,053,369 | 10/1991 | Winkler et al. | 501/152 |
| 5,076,815 | 12/1991 | Kunz et al. | 51/293 |
| 5,090,968 | 2/1992 | Pellow | 51/293 |
| 5,114,891 | 5/1992 | Kunz et al. | 501/127 |
| 5,129,919 | 7/1992 | Kalinowski | 51/309 |
| 5,139,978 | 8/1992 | Wood | 501/127 |
| 5,152,810 | 10/1992 | Rue et al | 51/309 |

FOREIGN PATENT DOCUMENTS

| | | | |
|---|---|---|---|
| 408771 | 1/1989 | European Pat. Off. | C04B 35/10 |
| 92/01646 | 7/1990 | WIPO | C04B 35/10 |

Primary Examiner—Jack W. Lavinder
Attorney, Agent, or Firm—David Bennett

[57] ABSTRACT

Superabrasive tools incorporating into the structure filamentary particles formed from a microcrystalline alumina confer significant advantages which depend on the orientation of the particles.

8 Claims, 1 Drawing Sheet

SUPERABRASIVE TOOL

BACKGROUND OF THE INVENTION

This invention relates to superabrasive tools such as rim wheels and wheel segments which comprise a superabrasive grain such as diamond or cubic boron nitride, (CBN).

Tools containing superabrasives are widely used for cutting extremely tough materials such as concrete for example. It is found however that the cost of such wheels is very high because the superabrasive component itself is very expensive. There is therefore considerable interest in the production of tools that are very effective and at the same time less expensive than tools in which the superabrasive component provides 100% of the abrasive content.

One such approach is illustrated in U.S. Pat. Nos. 5,152,810 and 4,944,773 in which part of the superabrasive component is replaced by a sol-gel alumina abrasive with surprisingly advantageous results and a significantly lowered cost.

The present invention provides a further advance in such technologies by providing the sol-gel alumina in a form conferring advantages in a highly efficient manner and adding new possibilities not described in the prior art.

DESCRIPTION OF THE INVENTION

Figure 1:
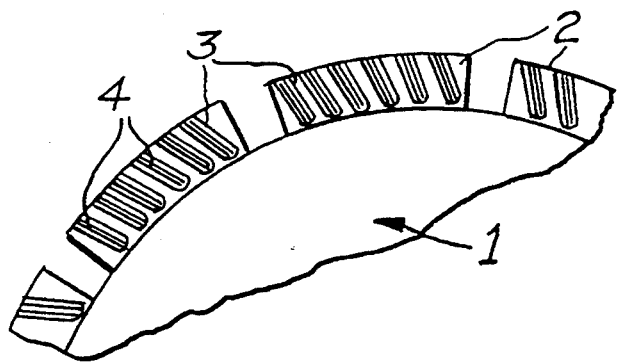
FIG. 1 is a partial side view of a segment wheel of the type used for cutting concrete.

The present invention provides an abrasive tool comprising a bond material having dispersed therein abrasive grains comprising at least one superabrasive component and filamentary particles of a microcrystalline alumina having an essentially uniform orientation.

The filamentary particles are essentially uniformly oriented by which is meant that their longitudinal axes are alligned such that the majority, and more preferably at least 75%, lie within a 120° arc and more preferably within an arc of about 60°.

The filamentary particles have a substantially uniform cross-sectional shape along an axis of symmetry and have an aspect ratio, (defined as the ratio between the length along the axis of symmetry and the greatest dimension perpendicular to that axis), of at least about 3:1 and preferably at least about 10:1. In some cases the filamentary particles can be much longer and even joined to form a continuous filament for at least the pre-use configuration of the tool. In the event a continuous filament is used to make the abrasive tool, the filament is laid in multiple tight folds with the sides of the folds essentially parallel in the desired direction of orientation of the filamentary particles. Such a continuous filament behaves essentially as a plurality of individual filaments, and for this reason is understood to fall within the essential scope of this invention.

The cross-sectional shape of the particles can be anything convenient but the most easily fabricated shapes are round or roughly square. Nevertheless the utility of the invention is not constrained by the shape of the cross-section.

The particles comprise a microcrystalline alpha alumina by which is meant that the individual crystallographically distinct domains or crystallites that make up the particles have an average diameter, (as measured by the average length of an intercept line drawn across a cross-section of the particle), of less than about 10 microns and preferably less than about one micron. The particle can contain other components such as phases comprising magnesia, zirconia, spinels, and rare earth metal oxides but is comprised of at least about 60% by weight, and more preferably at least 90% by weight, of alpha alumina. The density of the particles should be at least about 90%, and preferably at least 95% of the theoretical density for the composition. The most preferred particles have a hardness of at least 18 and more preferably at least 20 GPa.

It is often desirable that the filamentary particles contain other components modifying their abrasive properties. For example finely divided abrasive particles, such as diamond, CBN, tungsten carbide and the like, can be incorporated. Other particulate matter that can be incorporated might include high temperature-stable lubricants such as boron nitride (hexagonal form), molybdenum sulfide and graphite, grinding aids such as metallic tin and other fillers. Such additions are preferably chosen to ensure that their quantity and physical properties do not excessively reduce the hardness and strength that characterize the unmodified sol-gel alumina filamentary particles.

Such particles are made by a sol-gel process in which a sol of an alpha alumina precursor is gelled, usually by addition of an acid, dried, then fired. The size of the crystallites in the particle can be reduced by addition of a material effective to nucleate the crystallization of the alpha alumina from the precursor phase. Such materials are usually isostructural with the alpha alumina phase that is being formed with lattice parameters that as close as possible to those of alpha alumina itself. Alternatively the crystallite size can be limited by the use of pinning agents that restrain the growth process during the firing to form alpha alumina. Included among patents teaching suitable methods of making the filamentary particles are U.S. Pat. Nos. 4,314,827; 4,632,364; 4,744,802; 4,770,671; 4,881,951; 4,954,462; 4,964,883; 5,053,369; 5,076,815; 5,114,891; 5,139,978; European Application 408,771 and PCT Application 92/01646.

The particles can be made in any convenient manner but the most accessible route is through extrusion. In such a process the alpha precursor is extruded as a gel and then dried and fired to form the filaments. One suitable apparatus for producing such filaments is described in U.S. Pat. No. 5,090,968. It is also possible to extude and dry the filaments to a point at which they can conveniently be handled, incorporate them in the tool as it is formed and fire them in situ in the abrasive tool.

The orientation of the filamentary particles in the tool is particularly important in determining the types of properties that the tool will have. In one preferred embodiment the filamentary particles will be oriented such that they are alligned perpendicular to the abrading surface of the tool or at an angle less than about 60° to such surface. Often it is more advantageous to have the particles angled to the line perpendicular to the abrading surface providing the direction in which the tool moves against the workpiece is constant as would be the case if the tool were located at the rim of a cutting wheel. In this case the particles act as abrasives, significantly augmenting the cutting action of the wheel and permitting the use of less of the superabrasive component while sacrificing little of the cutting performance. It is particularly advantageous to provide that the filamentary particles are radially oriented and are located at the edges of a cutting wheel. This may be within the matrix of the tool or bonded into grooves cut in the side of the tool to accomodate the particles and a bond to locate them securely in such grooves.

Another orientation that is particularly useful, especially in wheels designed for cutting as for example a concrete cutting segmental wheel, has the axis of symmetry of the filaments essentially parallel to the cutting surface but located at the edges thereof. Conventional concrete cutting wheels tend to wear at the edges such that the width of the cut made will decrease as the wheel wears. Filamentary particles lying parallel to the cutting surface will provide even wear properties, inhibit segment erosion at the edges, and keep the cutting surface square. In such situations the filamentary particles are acting to reduce wear rather than as abrasives in themselves.

The tool itself can have any convenient form. A common shape is that of a wheel with the abrasive located at least at the periphery. Because of the cost of the superabrasive and because the wheels are conventionally used in situations where the wheel is under great stress, it is common to use a solid metal plate as the core portion of the wheel with the abrasive located at the rim, often in the form of segments attached to the core portion. The bond in which the abrasive is held in such cases is commonly a metal. The means of attachment is not critical providing it affords a strong, permanent attachment to the core portion. Suitable means include welding, brazing and sintering.

Another application in which the term "tool" refers to a segment rather than a structure into which the segment is or may be incorporated, is a saw such as a gang saw where the segments are attached to a metal blade to provide the cutting edges of the teeth of the saw. Still another example of a suitable tool would include the abrading surfaces of a Blanchard grinder.

Notwithstanding the above, the tools of the invention can include structures in which the abrasive is held in resinous or vitreous bonds.

DESCRIPTION OF PREFERRED EMBODIMENTS

The invention is now described in more detail with reference to the attached Drawings which are for the purpose of illustration only and are intended to imply any necessary limitations on the essential scope of the invention.

FIG. 1 is a partial side view of a segment wheel of the type used for cutting concrete. The core portion, 1, is of solid metal and segments, 2, are attached to the edge to form the cutting portion of the wheel. Grooves, 3, are cut or pressed into the side of the segments at an angle of about 45° to the radial direction and abrasive filaments are laid in the grooves and bonded to the segment by a metal bond. The body of the segment comprises diamond grains with aa appropriate particle size bonded by a metal bond.

Figure 2:
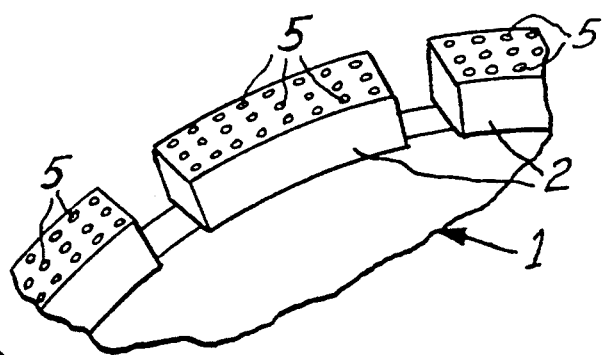
FIG. 2 is a perspective view of a wheel wherein the abrasive filaments are laid into the body of the segment.

FIG. 2 is a perspective view of a portion of a similar wheel to that shown in FIG. 1 except that the abrasive filaments are laid into the body of the segment as it is formed. This may be done by laying the filaments in individually but more conveniently the filament can be laid in tight serpentine folds as the segment is formed such that the grinding surface shows one set of folds each of which, on grinding, is worn down to expose two filament ends. FIG. 2 shows the segment in this configuration with the ends, 5, exposed on the cutting surface.

Figure 3:
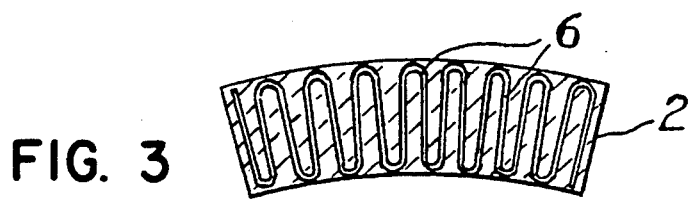
FIG. 3 is a cross section of the segment of FIG. 2.

FIG. 3 is cross-section of the segment of FIG. 2 before the tops of the folds, 6, have been ground down to expose two filament ends.

Figure 4:
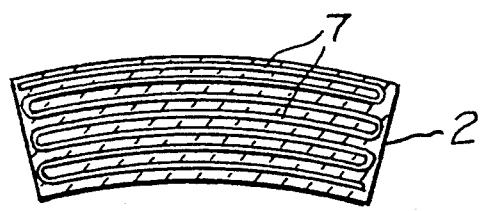
FIG. 4 is a cross section of a segment designed for attachment to a segment wheel.

FIG. 4 is a cross-section of a segment designed for attachment to a segment wheel as in FIGS. 1–3, wherein the filamentary abrasive, 7, is laid in tight fan-folds parallel to the grinding surface.

Figure 5:
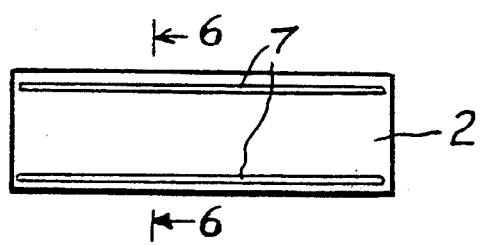
FIG. 5 is a top view of the segment of FIG. 4.

FIG. 5 is a top view of the segment of FIG. 4 after a period of wear to expose the filamentary abrasive particle, 7, laid parallel to the sides of the segment and adjacent the edges.

Figure 6:
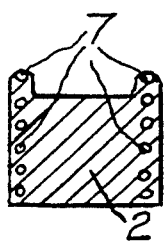
FIG. 6 is a cross section of the segment shown in FIGS. 4 and 5 taken perpendicular to the cross section of FIG. 4.

FIG. 6 is a cross-section of the segment shown in FIGS. 4 and 5 taken perpendicular to the cross-section of FIG. 4. The section is of a used wheel showing in exaggerated form that the filamentary particles, 7, cause the segment to wear to a U-shape and thus maintain its width of cut rather than becoming rounded in profile.

Other configurations with potential advantages can be devised combining the abrasive power of superabrasives and the particular structural advantages that flow from the use of the filamentary particles. These include for example forming the filamentary abrasive into an interlaced ring rather in the manner a ball of string may be wound with preferably a more flattened profile and then forcing a shapeable mixture of bond plus superabrasive to fill the interstices in the interlaced ring and then curing, firing or otherwise causing the bond material to become rigid in the form of an abrasive tool such as a wheel.

Such a structure could be given particular advantages by causing the dimensions of the interstices to be of such a size as to entrap grains of superabrasive and thus present them in a very rigid retaining structure to the surface to be ground or cut.

What is claimed is:

1. An abrasive tool having a cutting or abrading surface, said tool comprising a bond material having dispersed therein abrasive grains comprising at least one superabrasive component and microcrystalline alumina filamentary abrasive particles with an essentially uniform orientation, wherein the filamentary abrasive particles are located predominantly along two opposed parallel sides of the tool perpendicular to the cutting or abrading surface thereof.

2. An abrasive tool according to claim 1 in which the filamentary particles are oriented essentially perpendicular to the cutting or abrading surface of the tool.

3. A segmental wheel comprising segments which are abrasive tools according to claim 2.

4. An abrasive tool according to claim 1 in which the filamentary particles are oriented parallel to the cutting surface and adjacent lateral edges thereof.

5. A segmental wheel comprising segments which are abrasive tools according to claim 4.

6. An abrasive tool according to claim 1 in which the filamentary particles incorporate finely divided particles of an additive selected from abrasives, high temperature-stable lubricants and grinding aids.

7. A segmental wheel comprising segments which are abrasive tools according to claim 6.

8. An abrasive tool according to claim 1 in which the bond material is a metal bond.

* * * * *